United States Patent
Dong

(10) Patent No.: US 12,369,111 B2
(45) Date of Patent: Jul. 22, 2025

(54) DATA TRANSMISSION METHOD AND APPARATUS, COMMUNICATION DEVICE AND STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 392 days.

(21) Appl. No.: 17/905,893

(22) PCT Filed: Mar. 10, 2020

(86) PCT No.: PCT/CN2020/078662
§ 371 (c)(1),
(2) Date: Sep. 8, 2022

(87) PCT Pub. No.: WO2021/179179
PCT Pub. Date: Sep. 16, 2021

(65) Prior Publication Data
US 2023/0121989 A1 Apr. 20, 2023

(51) Int. Cl.
*H04W 28/082* (2023.01)
*H04L 5/00* (2006.01)
*H04W 48/18* (2009.01)
*H04W 76/15* (2018.01)

(52) U.S. Cl.
CPC .......... *H04W 48/18* (2013.01); *H04L 5/0048* (2013.01); *H04W 76/15* (2018.02)

(58) Field of Classification Search
CPC ... H04W 48/18; H04W 76/15; H04W 28/082; H04W 28/0958; H04W 84/12; H04L 5/0048; H04L 1/04

USPC ......................................................... 370/329
See application file for complete search history.

(56) References Cited

U.S. PATENT DOCUMENTS

| | | | | |
|---|---|---|---|---|
| 11,943,809 B2* | 3/2024 | Jang | ................... | H04W 72/0446 |
| 2018/0110046 A1* | 4/2018 | Patil | ................... | H04W 72/0446 |
| 2019/0158385 A1 | 5/2019 | Patil et al. | | |
| 2019/0158413 A1* | 5/2019 | Patil | ................... | H04W 28/0838 |
| 2020/0037395 A1* | 1/2020 | Ko | ........................ | H04W 80/08 |
| 2023/0076285 A1* | 3/2023 | Ko | ........................ | H04W 76/15 |

FOREIGN PATENT DOCUMENTS

| | | |
|---|---|---|
| CN | 105828394 A | 8/2016 |
| CN | 105978653 A | 9/2016 |
| CN | 109716832 A | 5/2017 |

(Continued)

OTHER PUBLICATIONS

International Search Report issued Dec. 7, 2020, in PCT/CN2020/078662 filed Mar. 10, 2020, 4 pages.

(Continued)

*Primary Examiner* — Christopher M Crutchfield
*Assistant Examiner* — Syed Ahmed
(74) *Attorney, Agent, or Firm* — Oblon, McClelland, Maier & Neustadt, L.L.P.

(57) ABSTRACT

Data transmission methods are provided. A data transmission method applied to a device supporting multi-link communication includes: determining channel status of at least two links in multiple links of the device; and determining whether to transmit first data on a first link of the at least two links based on the channel status of the at least two links.

13 Claims, 6 Drawing Sheets

(56) References Cited

FOREIGN PATENT DOCUMENTS

| CN | 106856629 | A | | 6/2017 | | |
|---|---|---|---|---|---|---|
| CN | 107182076 | A | | 9/2017 | | |
| CN | 108271263 | A | | 7/2018 | | |
| CN | 108353429 | A | | 7/2018 | | |
| CN | 2019-165513 | A | | 9/2019 | | |
| EP | 3373682 | A1 | * | 12/2018 | ............ | H04W 72/08 |
| TW | 201924403 | A | | 6/2019 | | |
| WO | WO 2017/012182 | A1 | | 1/2017 | | |
| WO | WO 2017/209432 | A1 | | 12/2017 | | |
| WO | WO 2018/094942 | A1 | | 5/2018 | | |

OTHER PUBLICATIONS

Edward Au, "IEEE 802.11be: Extremely High Throughput", IEEE Vehicular Technology Magazine, vol. 14, No. 3, 2019, 2 pages.

Lei Peng et al., "CIPN-based model building and collaborative simulation for network protocols", Computer Integrated Manufacturing Systems, vol. 15 No. 1, Jan. 2009, 8 pages (with English Abstract).

Jing-yun Peng et al., "Analysis of Wireless LAN MAC Protocol and Backoff Algorithm", Software Guide, vol. 17 No. 3, Mar. 2018, pp. 84-86 (with English Abstract).

Der-Jiunn Deng et al., "IEEE 802.11ax: Highly Efficient WLANs for Intelligent Information Infrastructure", IEEE Communications Magazine, Dec. 13, 2017, pp. 52-59.

Combined Chinese Office Action and Search Report issued Jun. 16, 2023 in Chinese Patent Application No. 202080000495.1 (with English Translation of Office Action only), 16 pages.

Written Opinion of the International Searching Authority issued Dec. 7, 2020 in PCT/CN2020/078662 (with English Translation), 9 pages.

* cited by examiner

```
┌──────────────────────────────────────────┐
│ Determine channel status of at least two links in │ ─── 21
│        multiple links of the device      │
└──────────────────────────────────────────┘
                    │
                    ▼
┌──────────────────────────────────────────┐
│ In response to a data frame of the second data   │
│ transmitted on the first link including an Intra-PPDU │ ─── 81
│ of Basic Service Set, transmit the first data on the │
│ first link; or, in response to the data frame of the │
│ second data transmitted on the first link including an │
│ Inter-PPDU of Basic Service Set, not to transmit the │
│           first data on the first link    │
└──────────────────────────────────────────┘
```

FIG.8

```
┌──────────────────────────────────────────┐
│ Determine channel status of at least two links in │ ─── 21
│        multiple links of the device      │
└──────────────────────────────────────────┘
                    │
                    ▼
┌──────────────────────────────────────────┐
│ In response to a BSS color (Basic Service Set color) │
│ parsed from a SIG (Signal field) of a data frame of │
│ the second data transmitted on the first link being │ ─── 91
│     same as a BSS color of an AP (Access Point) │
│ associated with a device, determine the data frame of │
│ the second data transmitted on the first link to be an │
│ Intra-PPDU; or, in response to the BSS color parsed │
│ from the SIG of the data frame of the second data │
│ transmitted on the first link being different from the │
│     BSS color of the AP associated with the device, │
│     determine the data frame of the second data │
│   transmitted on the first link to be an Inter-PPDU │
└──────────────────────────────────────────┘
                    │
                    ▼
┌──────────────────────────────────────────┐
│ In response to a data frame of the second data   │
│ transmitted on the first link including an Intra-PPDU │ ─── 81
│ of Basic Service Set, transmit the first data on the │
│ first link; or, in response to the data frame of the │
│ second data transmitted on the first link including an │
│ Inter-PPDU of Basic Service Set, not to transmit the │
│           first data on the first link    │
└──────────────────────────────────────────┘
```

FIG.9

DATA TRANSMISSION METHOD AND APPARATUS, COMMUNICATION DEVICE AND STORAGE MEDIUM

CROSS-REFERENCE TO RELATED APPLICATION

The present application is a U.S. National Stage of International Application No. PCT/CN2020/078662 filed on Mar. 10, 2020, the entire content of which is incorporated herein by reference for all purposes.

BACKGROUND OF THE INVENTION

Field of the Invention

The present disclosure relates to, but not limited to wireless communication technologies, and in particularly relates to data transmission methods and apparatuses, communication devices and storage media.

Description of the Related Art

Research on the Wi-Fi technology becomes a hot research topic in recent years, and a scope of the research includes 320 MHz bandwidth transmission, aggregation and synergy of multiple frequency bands, and so on. Proposed visions of the research include improving a transmission rate, improving throughput, and reducing latency. Main application scenarios of which include video transmission, Augmented Reality, Virtual Reality, and so on. The aggregation of multiple frequency bands or multiple links means that a device transmits data on multiple frequency bands/links (2.4 GHz, 5 GHz, and 6-7 GHz) at a same time, and advantages of which are: 1. transmitting data with a different content on each frequency band may improve throughput of a whole system; and 2. transmitting data with a same content on each frequency band may improve success rate of data transmitting or receiving.

In order to further improve the throughput of the system, there may be a device supporting multi-link communication in a wireless system, and the device supports communication on multiple links. However, when the device supporting multi-link communication communicates, there may be mutual interference between multiple links in the device, which affects communication reliability of the device.

SUMMARY OF THE INVENTION

Embodiments of the present disclosure provide indication methods, apparatuses, communication devices and storage media for transmitting data.

According to a first aspect of embodiments of the present disclosure, there is provided a data transmission method. The method is applied to a device supporting multi-link communication and includes determining channel status of at least two links in a plurality of links of the device, and determining whether to transmit first data on a first link of the at least two links based on the channel status of the at least two links.

According to a second aspect of embodiments of the present disclosure, there is provided a communication device, including an antenna, a memory, and a processor, respectively connected to the antenna and the memory. The processor can be configured to, by executing an executable program stored in the memory, control the antenna to transmit and receive wireless signals and perform following operations: determining channel status of at least two links in a plurality of links of the device; and determining whether to transmit first data on a first link of the at least two links based on the channel status of the at least two links.

According to a third aspect of embodiments of the present disclosure, there is provided a non-transitory computer-readable storage medium, the non-transitory computer-readable storage medium stores an executable program, where when the executable program is executed by a processor, the steps of the methods provided by any one of the above technical solutions are performed.

In embodiments of the present disclosure, channel status of at least two links in a plurality of links of a device is determined; whether to transmit first data on a first link of the at least two links is determined based on the channel status of the at least two links. The channel status of the at least two links in the plurality of links of the device is determined. In this way, before transmitting the first data on the first link of the at least two links, whether to transmit the first data on the first link of the at least two links is determined based on the channel status of the at least two links. When there is data transmission on the other links of the at least two links, data may not be transmitted on the first link; when there is no data transmission on the other links of the at least two links, data may be transmitted on the first link. In this way, interference between links caused by data transmission on the plurality of links at a same time may be reduced, and communication reliability of a device may be improved.

BRIEF DESCRIPTION OF THE DRAWINGS

Various exemplary embodiments of this disclosure that are proposed as examples will be described in detail with reference to the following figures, wherein like numerals reference like elements, and wherein:

FIG. 8 is a schematic diagram illustrating a data transmission method according to another embodiment of the present disclosure.

FIG. 9 is a schematic diagram illustrating a data transmission method according to another embodiment of the present disclosure.

DETAILED DESCRIPTION OF THE PREFERRED EMBODIMENTS

Examples of embodiments will be described in detail here, examples of which are illustrated in the accompanying drawings. When the following description relates to the accompanying drawings, unless specified otherwise, the same numerals in different drawings represent the same or similar elements. The implementations described in the following examples of embodiments do not represent all implementations consistent with this application. On the contrary, the implementations are merely examples of apparatuses and methods that are described in detail in the appended claims and that are consistent with some aspects of the present disclosure.

The terms used in the present disclosure are for the purpose of describing a particular example only, and are not intended to limit the present disclosure. The singular forms such as "a," "said," and "the" used in the present disclosure and the appended claims are also intended to include multiple, unless the context clearly indicates otherwise. It should also be understood that the term "and/or" used herein includes any and all possible combinations of one or more of the associated listed items.

It is to be understood that although different information may be described using the terms such as "first," "second," "third," etc. in the present disclosure, the information should not be limited to these terms. These terms are used to distinguish one category of information from another. For example, the first information may also be referred to as the second information without departing from the scope of the present disclosure, and similarly, the second information may also be referred to as the first information. Depending on the context, the word "if" as used in the present disclosure may be interpreted as "when" or "upon" or "in response to determining".

In order to better describe any embodiment of the present disclosure, an embodiment of the present disclosure takes a wireless communication scenario of a device supporting multi-link communication as an example for illustrative description.

Figure 1:
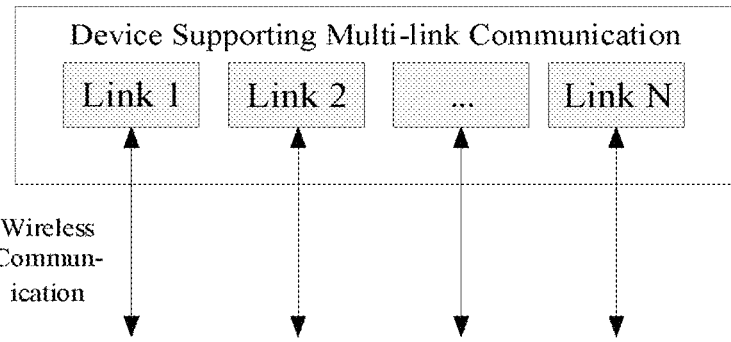
FIG. 1 illustrates a wireless communication scenario of a device supporting multi-link communication according to an embodiment of the present disclosure.

As shown in FIG. 1, a wireless communication scenario of a device supporting multi-link communication is provided by an embodiment of the present disclosure. In this application scenario, the device supports communication on multiple links. The multiple links include link 1, link 2, . . . , and link N; where N is a positive integer. When the device supporting multi-link communication communicates wirelessly with an Access Point (AP), data may be transmitted on each of the links.

In an embodiment, when the device supporting multi-link communication transmits data to the access point through the link 1, if data is being transmitted on any one of the link 2 to link N, interference may occur between the links, causing data transmission on the link 1 to fail and affecting reliability of wireless communication between the device supporting multi-link communication and the access point.

Figure 2:
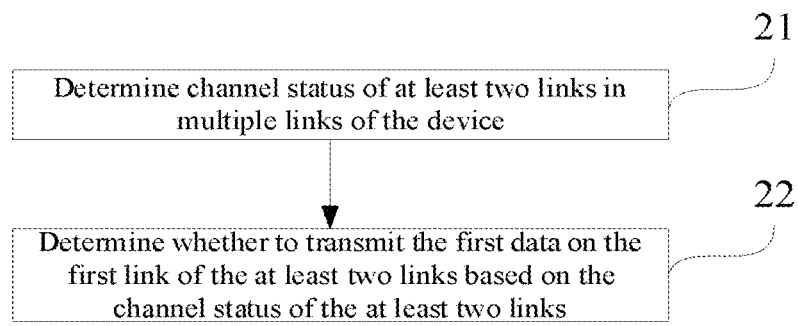
FIG. 2 is a schematic diagram illustrating a data transmission method according to an embodiment of the present disclosure.

As shown in FIG. 2, a data transmission method is provided by an embodiment of the present disclosure, which is applied to a device supporting multi-link communication. Referring to FIG. 2, the method includes following steps.

At step 21, channel status of at least two links in multiple links of the device is determined. In an embodiment, the device supporting multi-link communication may include any communication device connecting to an AP and supporting multiple link communication, which includes but is not limited to a mobile phone, a smart home device and/or a smart office device.

A service area where the AP is located may include multiple devices supporting multi-link communication. Taking a smart meter wireless system as an example, the AP may be a base station, a routing device or the like in the smart meter wireless system, and the device supporting multi-link communication may be a smart meter or the like in the smart meter wireless system. A distance between the device supporting multi-link communication and the AP is within a coverage area of the AP, so as to ensure that the device supporting multi-link communication may receive data transmitted by the AP.

In an embodiment, determining the channel status of the at least two of the multiple links of the device may include performing channel detection on all of the multiple links at a same time to obtain a detection result of each of the multiple links; or may include performing channel detection on a part of the multiple links to obtain a detection result of each of the part of links.

In an embodiment, the detection result may include a detection result indicating that a link is in busy status or a detection result indicating that a link is in idle status. The busy status may be occupied status in which data is transmitted on the link; and the idle status may be unoccupied status in which no data is transmitted on the link.

In some examples, the multiple links may refer to multiple bandwidths in a frequency band. In some examples, the frequency band may refer to 2.4 GHz, 5 GHz and/or 6-7 GHz. A bandwidth may refer to a width of an operating spectrum under a frequency band, for example, 20 MHz, 40 MHz and the like. And one link may correspond to one bandwidth.

In some embodiments, the multiple links may be links in a Basic Service Set (BSS), where the links include same or different channel bandwidths in a same frequency band, or links in a BSS, where the links include same or different channel bandwidths in different frequency bands.

The multiple links can be understood as multiple channels for data transmission. For example, each of the multiple links corresponds to one channel for data transmission. In a wireless communication system, there may be multiple links between a device and an access point, such as first link, second link and the like. For the device supporting multi-link communication, data can be transmitted or received on the multiple links.

In an embodiment, the multiple links may include link 1, link 2, . . . , and link N; where N is a positive integer. Thus, all links include all N links from link 1 to link N in total.

In an embodiment, before transmitting first data on a first link in the multiple links, channel detection may be performed on all links in the multiple links at a same time to obtain a detection result of each of the multiple links; or channel detection may be performed on a part of the multiple links to obtain a detection result of each of the part of links.

At step 22, whether to transmit the first data on the first link of the at least two links is determined based on the channel status of the at least two links. Each link corresponds to one channel for data transmission when transmitting data. And each channel may have different channel status at different moments.

In an embodiment, at a first moment, channel status of a first link may be first status in which data is transmitted on the first link. The first status may be the busy status. At a second moment, the channel status of the first link may be second status in which no data is transmitted on the first link. The second status may be the idle status.

Whether a channel of a link is in the busy status or in the idle status may be determined by sensing a signal strength of the channel when transmitting data.

In an embodiment, when a sensed signal strength value of the channel of the first link is less than a preset threshold, the channel status of the first link may be determined to be the idle status; and when the sensed signal strength value of the channel of the first link is greater than the preset threshold, the channel status of the first link may be determined to be the busy status.

In one embodiment, when sensing that all of the links in the multiple links are idle, the device determines to transmit the first data on the first link in the multiple links. The first data is data to be transmitted on the first link.

In another embodiment, when sensing that any one link in the multiple links other than the first link is busy, the device determines not to transmit the first data on the first link in the multiple links.

In embodiments of the present disclosure, the channel status of the at least two of the multiple links of the device is determined. In this way, before transmitting the first data on the first link of the at least two links, whether to transmit the first data on the first link of the at least two links is determined based on the channel status of the at least two links. When there is data transmitting on one or more of the other links of the at least two links, data may not be transmitted on the first link. When there is no data transmitting on the other links of the at least two links, data may be transmitted on the first link. In this way, interference between links caused by simultaneous data transmission on multiple links at a same time may be reduced, and communication reliability of the device may be improved.

In an embodiment, all of multiple links of the device supporting multi-link communication may be sensed. Sensing all or part of the multiple links may be sensing channel status of each of the multiple links. The multiple links may be all links or a part of links of a device supporting multi-link communication.

Figure 3:
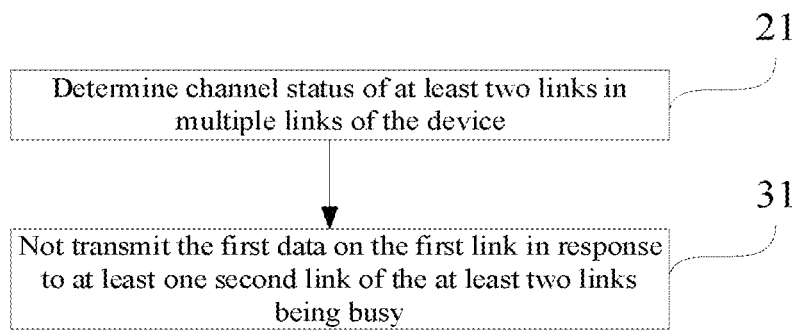
FIG. 3 is a schematic diagram illustrating a data transmission method according to another embodiment of the present disclosure.

As shown in FIG. 3, a data transmission method is provided by another embodiment of the present disclosure, Referring to FIG. 3, at step 22, whether to transmit the first data on the first link of the at least two links is determined based on the channel status of the at least two links may include following steps.

At step 31, in response to determining that at least one second link of the at least two links is busy, the first data is not transmitted on the first link. In an embodiment, in response to determining that one second link of the at least two links is busy, not to transmit the first data on the first link may be determined.

In another embodiment, in response to determining that multiple second links of the at least two links are busy, not to transmit the first data on the first link may be determined.

In an embodiment, the multiple links include link 1, link 2, . . . , and link N; where N is a positive integer. The first link may be link 1, and the second link may be any of link 2 to link N, for example, link 2 or link 3. The at least one second link is busy may include one or more links of link 2 to link N are busy. For example, link 2 and link 5 are busy, or link 7 is busy.

Figure 4:
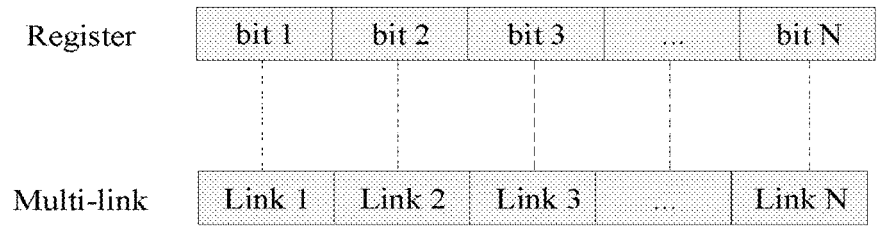
FIG. 4 is a schematic diagram illustrating a register according to another embodiment of the present disclosure.

In an embodiment, referring to FIG. 4, each link may be associated with a bit of a register including multiple bits, and each of the bits is for indicating channel status of a link. In an embodiment, referring to Table 1, there are N bits in total, and each of the bits is associated with one of links from link 1 to link N sequentially. When a value of a bit is "1", channel status of a link indicated by the bit is busy. When the value of the bit is "0", the channel status of the link indicated by the bit is idle. Channel status of an indicated link may be determined by querying a value of each of the bits. In an embodiment, a device supporting multi-link communication may update a value of each of the bits in the register during each communication.

TABLE I

| connection name | Position of bit in register | Bit value | channel status |
| --- | --- | --- | --- |
| Link 1 | 1 | 0 | idle |
| Link 2 | 2 | 1 | busy |
| . . . | . . . | . . . | . . . |

In embodiments of the present disclosure, when at least one second link of the at least two links is sensed to be busy, not to transmit first data on a first link is determined, which reduces interference between links caused by data transmission on multiple links at a same time, and improves communication reliability of a device.

Figure 5:
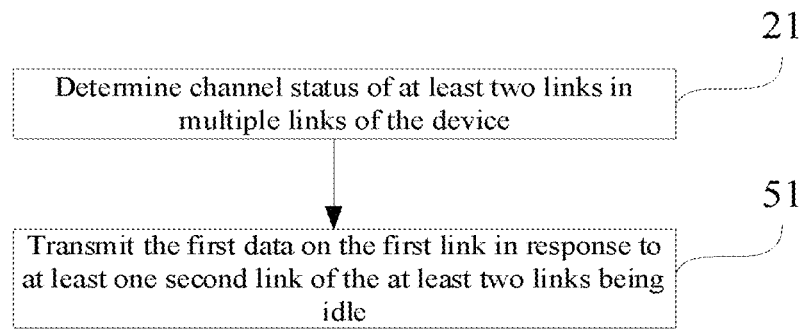
FIG. 5 is a schematic diagram illustrating a data transmission method according to another embodiment of the present disclosure.

As shown in FIG. 5, a data transmission method is provided by another embodiment of the present disclosure. Referring to FIG. 5, at step 22, whether to transmit the first data on the first link of the at least two links is determined based on the channel status of the at least two links may include followings.

At step 51, in response to determining that at least one second link of the at least two links is idle, the first data is transmitted on the first link.

A communication frequency band corresponding to the first link may be a first frequency band; and a communication frequency band corresponding to a busy second link may be a second frequency band. The first frequency band is different from the second frequency band, for example, the first frequency band is a 2.4 GHz frequency band, and the second frequency band is a 5 GHz frequency band. In an embodiment, no interference may occur between links with different communication frequency bands.

In an embodiment, the second link may be any one link of the at least two links other than the first link. The second link is idle may mean that all of the at least two links other than the first link are idle.

In an embodiment, in response to determining that one second link of the at least two links is idle, the first data may be transmitted on the first link.

In another embodiment, in response to determining that multiple second links of the at least two links are idle, the first data may be transmitted on the first link.

In an embodiment, a detection of the channel status of the first link and a detection of the channel status of the second link are performed simultaneously.

Figure 6:
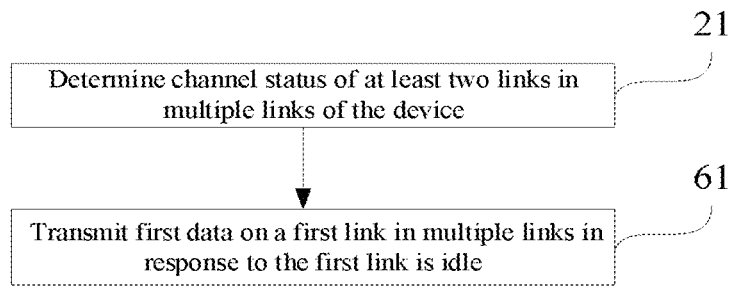
FIG. 6 is a schematic diagram illustrating a data transmission method according to another embodiment of the present disclosure.

As shown in FIG. 6, a data transmission method is provided by another embodiment of the present disclosure. Referring to FIG. 6, the method further includes followings.

At step 61, in response to determining that a first link is idle, first data is transmitted on the first link in multiple links.

In an embodiment, both the first link and a second link are idle. Since both the first link and the second link are idle, when transmitting first data on the first link, there is no transmission conflict caused by data being transmitted on the first link, and there is no interference caused by the second link, which can ensure reliability of communication.

Figure 7:
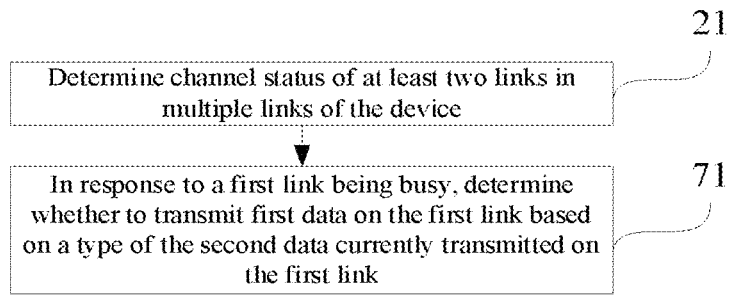
FIG. 7 is a schematic diagram illustrating a data transmission method according to another embodiment of the present disclosure.

In another embodiment, a communication frequency band corresponding to the first link is a first frequency band; a communication frequency band corresponding to the busy second link is a second frequency band. The first frequency band is different from the second frequency band. Since there is no interference between links with communication bands belonging to different frequency bands, when transmitting the first data on the first link, no transmission conflict caused by data being transmitted on the first link, and no interference from the second link, are present, which may ensure reliability of communication. As shown in FIG. 7, a data transmission method is provided by another embodiment of the present disclosure. Referring to FIG. 7, the method further includes followings.

At step 71, in response to determining that a second link is busy, whether to transmit first data on the first link is determined based on a type of the second data currently transmitted on the second link. The second data is data currently being transmitted on the second link. The current may include a point in time when multiple links are sensed. The first data is data to be transmitted that is expected to be transmitted on the first link but has not yet been transmitted.

In an embodiment, the type of second data may be a type of data frame of the second data. In an embodiment, the type of data frame of the second data may include a type of an Intra-Physical layer Protocol Data Unit (Intra-PPDU) of a Basic Service Set (BSS) or a type of an Inter-Physical layer Protocol Data Unit (Inter-PPDU) of the BSS.

As shown in FIG. 8, a data transmission method is provided by another embodiment of the present disclosure. Referring to FIG. 8, at step 71, determining whether to transmit the first data on the first link based on the type of second data being transmitted on the second link may include followings.

In response to determining that a data frame of the second data transmitted on the second link includes an Intra-PPDU of a BSS, the first data is not transmitted on the first link, or, in response to determining that the data frame of the second data transmitted on the second link includes an Inter-PPDU of the BSS, the first data is not transmitted on the first link.

When the data frame of the second data being transmitted on the second link includes an Intra-PPDU of the BSS, the first data may not be transmitted on the first link in multiple links. When the data frame of the second data being transmitted on the second link includes an Inter-PPDU of the BSS, the first data may be transmitted on the first link in the multiple links.

In data transmission based on Orthogonal Frequency Division Multiple Access, in order to reduce interference of the data transmission, only the Intra-PPDUs of the BSS can be transmitted simultaneously on a same link, and the Intra-PPDU of the BSS and the Inter-PPDU of the BSS cannot be transmitted simultaneously on a same link.

As shown in FIG. 9, a data transmission method is provided by another embodiment of the present disclosure. Referring to FIG. 9, a type of the second data currently transmitted on a second link is determined by a following method.

In response to determining that a Basic Service Set color (BSS color) parsed from a Signal field (SIG) of a data frame of the second data transmitted on the second link is identical to a BSS color of an Access Point (AP) associated with a device, the data frame of the second data transmitted on the second link may be determined to be an Intra-PPDU, or, in response to determining that the BSS color parsed from the SIG of the data frame of the second data transmitted on the second link is different from the BSS color of the AP associated with the device, the data frame of the second data transmitted on the second link may be determined to be an Inter-PPDU.

The SIG may be a first information field in a physical header of a corresponding data frame. The first information field includes one or more bits, and values of the bits are for representing the BSS colors. When the values of the bits are different, corresponding BSS colors are different.

BSS colors of different APs associated with the device may be different.

In an embodiment, the BSS color of the AP associated with the device may be pre-stored in a storage area. By comparing the pre-stored BSS color of the AP associated with the device with the BSS color parsed from the SIG in the physical header of the data frame of the second data, the two are identical or different may be determined.

The BSS color may be an identification of a physical layer protocol data unit of BSS. The BSS color may be for indicating that physical layer protocol data units belong to a same BSS, and different BSS colors may be for indicating different BSSs.

In an embodiment, when the device transmits a data packet on any link, if a data frame type of the data packet is the Intra-PPDU, a BSS color carried by a signal field in a physical header of the data frame of the data packet is a first value; if the data frame type of the data packet is the Inter-PPDU, the BSS color carried by the signal field in the physical header of the data frame of the data packet is a second value. In this way, on a transmission channel or at a receiving end, the type of the data packet can be determined by parsing the BSS color carried by the signal field in the physical header of the data frame of the data packet transmitted on each link. For example, when the BSS color is the first value, the data frame type of the data packet is the Intra-PPDU; when the BSS color is the second value, the data frame type of the data packet is the Inter-PPDU.

Figure 10:
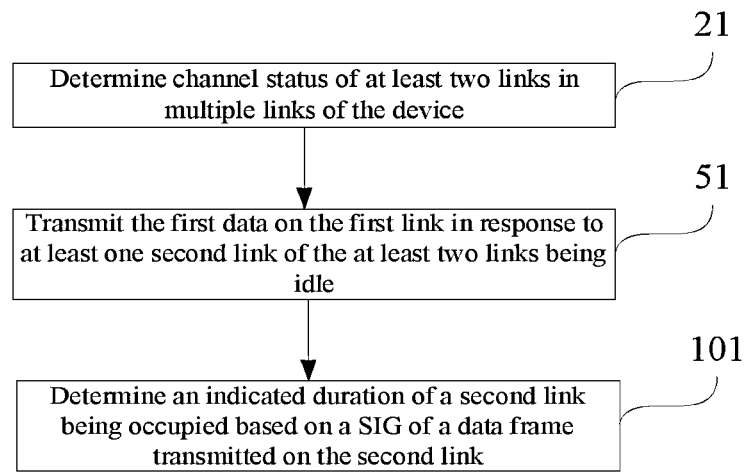
FIG. 10 is a schematic diagram illustrating a data transmission method according to another embodiment of the present disclosure.

As shown in FIG. 10, a data transmission method is provided by another embodiment of the present disclosure. Referring to FIG. 10, the method further includes followings.

At step 101, an indicated duration of a second link being occupied is determined based on a SIG of a data frame transmitted on the second link. In an embodiment, in response to sensing that a first link is idle and at least one second link of multiple links is busy, determining the indicated duration of the second link being occupied based on the SIG of the data frame transmitted on the second link; where the indicated duration is for indicating waiting time before performing channel sensing on the multiple links again; and the second link is any one link in the multiple links other than the first link.

In an embodiment, the SIG of the data frame may be a SIG in a physical header of the data frame.

In an embodiment, the SIG may include a second information field. The second information field indicates the indicated duration of the second link being occupied via one or more bits.

In an embodiment, the second information field indicates the indication duration via 3 bits. For example, when a bit value is "001", which represents the indication duration of 0.2 s; when the bit value is "010", which represents the indication duration of 0.5 s; when the bit value is "011", which represents the indication duration of 1 s. It should be noted that, a number of bits for indicating the indicated duration can be adjusted based on a number of indicated duration types. For example, when the number of indication duration types included in a station device exceeds 9, 4 bits are expected for indicating. The indicated duration type may refer to a value of the indicated duration. For example, 0.2 s, 0.5 s, 1 s, and the like.

In an embodiment, the channel sensing is performed on the multiple links again after the indicated duration to obtain channel status of each of the links. In this way, frequently performing unnecessary sensing on the multiple links can be reduced.

In an embodiment, the method further includes: in response to an expiration of the indicated duration of the second link being occupied, the channel status of the at least two links in the multiple links of the device may be determined again.

In an embodiment, the expiration of the indicated duration of the second link being occupied may include that a timing duration of a timer equals to the indicated duration. In an embodiment, the timer starts timing when the second link is occupied.

Figure 11:
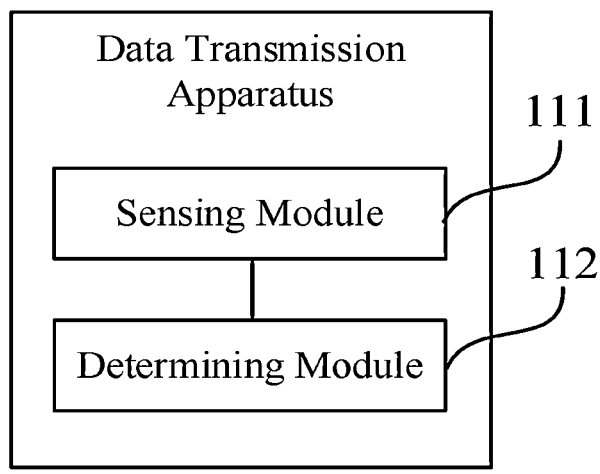
FIG. 11 is a schematic diagram illustrating a data transmission apparatus according to an embodiment of the present disclosure.

As shown in FIG. 11, a data transmission apparatus is provided by an embodiment of the present disclosure, and applied to a device supporting multi-link communication. Referring to FIG. 11, the apparatus includes a sensing module 111 and a determining module 112.

The sensing module 111 is configured to determine channel status of at least two links in multiple links of the device;

The determining module 112 is configured to determine whether to transmit first data on a first link of the at least two links based on the channel status of the at least two links.

In an embodiment, the determining module 112 is configured not to transmit the first data on the first link in response to determining that at least one second link of the at least two links is busy.

In an embodiment, the determining module 112 is further configured to transmit the first data on the first link in response to determining that at least one second link of the at least two links is idle.

In an embodiment, the determining module 112 is further configured to transmit the first data on the first link in the multiple links.

In an embodiment, the determining module 112 is further configured to, in response to determining that the second link is busy, determine whether to transmit the first data on the first link based on a type of second data currently transmitted on the second link.

In an embodiment, the determining module 112 is further configured to, in response to determining that a data frame of the second data transmitted on the second link is an Intra-PPDU of a Basic Service Set, not transmit the first data on the first link, or, in response to determining that the data frame of the second data transmitted on the second link is an Inter-PPDU of the Basic Service Set, transmit the first data on the first link.

In an embodiment, the determining module 112 is further configured to, in response to determining that a BSS color parsed from a SIG of the data frame of the second data transmitted on the second link is identical to a BSS color of an AP associated with the device, determine the data frame of the second data transmitted on the second link is an Intra-PPDU, or, in response to determining that the BSS color parsed from the SIG of the data frame of the second data transmitted on the second link is different from the BSS color of the AP associated with the device, determine the data frame of the second data transmitted on the second link is an Inter-PPDU.

In an embodiment, the determining module 112 is further configured to determine an indicated duration of the second link being occupied based on a SIG of data transmitted on the second link.

In an embodiment, the determining module 112 is further configured to determine the channel status of the at least two links in the multiple links of the device again in response to an expiration of the indicated duration of the second link being occupied.

Embodiments of the present disclosure also provide a communication device, including an antenna, a memory, and a processor connected to the antenna and the memory respectively. The processor can be configured to control the antenna to transmit and receive wireless signals, and perform steps of methods provided in any of above embodiments by executing an executable program stored in the memory.

The communication device provided in this embodiment may include an aforementioned terminal or base station. The terminal may include various handheld terminals or vehicle-mounted terminals. The base station may include various types of base stations, for example, a 4G base station or a 5G base station or the like.

The antennas may include various types of antennas, for example, mobile antennas such as 3G antennas, 4G antennas, or 5G antennas or the like; the antennas may also include Wi-Fi antennas or wireless charging antennas and so on.

The memory may include various types of storage media, which are non-transitory computer storage media that can continue to memorize information stored on them after the communication device is powered off.

The processor may be connected to the antenna and the memory through a bus or the like, and read the executable program stored in the memory for performing operations, for example, at least one of the methods provided by any one of the embodiments of the present disclosure.

Embodiments of the present disclosure further provide a non-transitory computer-readable storage medium, where an executable program is stored in the non-transitory computer-readable storage medium. When the executable program is executed by a processor, steps of methods provided in any of the above embodiments are implemented, for example, at least one of the methods provided by any one of the embodiments of the present disclosure.

Figure 12:
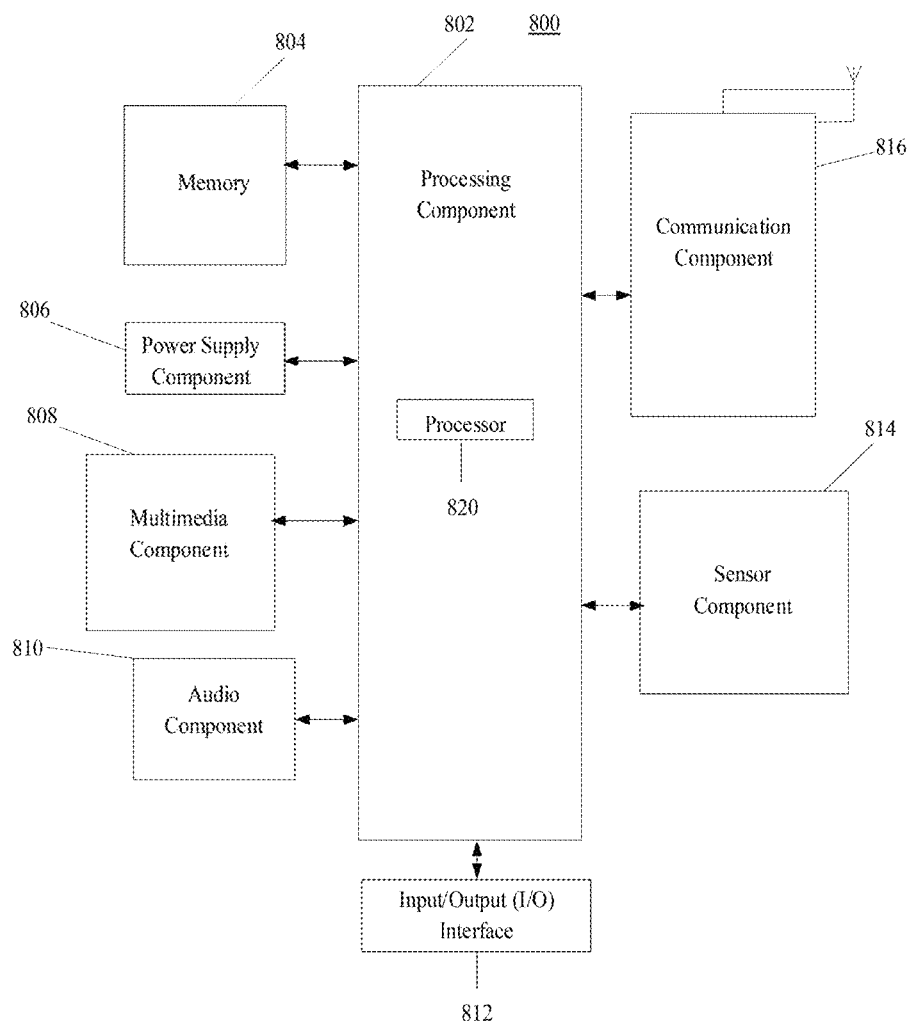
FIG. 12 is a schematic structural diagram illustrating a terminal according to an embodiment of the present disclosure.

As shown in FIG. 12, a structure of a terminal is provided by an embodiment of the present disclosure. Referring to the terminal 800 shown in FIG. 12, this embodiment provides a terminal 800, which may be a mobile phone, a computer, a digital broadcasting terminal, a messaging device, a game console, a tablet device, a medical device, a fitness device, a personal digital assistant and the like.

As shown in FIG. 12, the terminal 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls overall operations of the terminal 800, such as operations associated with display, phone calls, data communications, camera operations, and recording operations. The processing assembly 802 may include one or more processors 820 to execute instructions to complete all or a part of the blocks of the above methods. In addition, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store different types of data to support operations at the terminal 800. Examples of such data include instructions for any application or method operated on the terminal 800, such as contact data, phonebook data, messages, pictures, videos, and so on. The memory 804 may be implemented by any type of volatile or non-volatile storage devices or a combination of the above, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power supply component 806 supplies power for different components of the terminal 800. The power supply component 806 may include a power supply management system, one or more power supplies, and other components associated with generating, managing and distributing power for the terminal 800.

The multimedia component 808 includes a screen providing an output interface between the terminal 800 and a user. In some examples, the screen may include a Liquid Crystal Display (LCD) and a Touch Panel (TP) and so on. If the screen includes the TP, the screen may be implemented as a touch screen to receive input signals from the user. The TP may include one or more touch sensors to sense touches, swipes, and gestures on the TP. The touch sensor may not only sense the boundary of a touch or slide operation but also detect duration and pressure relating to the touch or slide operation. In some examples, the multimedia component 808 may include a front camera and/or a rear camera. When the terminal 800 is in an operation mode, such as a shooting mode or a video mode, the front camera and/or the rear camera may receive external multimedia data. Each of the front camera and the rear camera may be a fixed optical lens system or have focal length and optical zooming capability.

The audio component 810 is configured to output and/or input an audio signal. For example, the audio component 810 includes a microphone (MIC). When the terminal 800 is in an operation mode, such as a call mode, a record mode and a voice recognition mode, the microphone is configured to receive an external audio signal. The received audio signal may be further stored in the memory 804 or transmitted via the communication component 816. In some examples, the audio component 810 may also include a loudspeaker for outputting an audio signal.

The I/O interface 812 may provide an interface between the processing component 802 and peripheral interface modules. The above peripheral interface modules may include a keyboard, a click wheel, buttons and so on. These buttons may include but are not limited to, a home button, a volume button, a start button and a lock button.

The sensor component 814 includes one or more sensors to provide status assessments of various aspects for the terminal 800. For example, the sensor component 814 may detect an on/off state of the terminal 800 and a relative location of components. For example, the components are a display and a keypad of the terminal 800. The sensor component 814 may also detect a position change of the terminal 800 or of a component of the terminal 800, presence or absence of a touch of a user on the terminal 800, an orientation or acceleration/deceleration of the terminal 800, and a temperature change of the terminal 800. The sensor component 814 may include a proximity sensor for detecting the existence of a nearby object without any physical touch. The sensor component 814 may also include a Complementary Metal-Oxide-Semiconductor (CMOS) or Charged Coupled Device (CCD) image sensor applied in an imaging application. In some examples, the sensor component 814 may also include an acceleration sensor, a gyro sensor, a magnetic sensor, a pressure sensor, a temperature sensor, or the like.

The communication component 816 is to facilitate wired or wireless communication between the terminal 800 and other devices. The terminal 800 can access a wireless network based on any communication standard, such as Wi-Fi, 2G or 3G, or a combination of the above, or the like. In some examples, the communication component 816 receives a broadcast signal or broadcast related information from an external broadcast management system via a broadcast channel. In some examples, the communication component 816 may also include a Near Field Communication (NFC) module to facilitate short-range communications. For example, the NFC module may be implemented based on a Radio Frequency Identification (RFID) technology, an Infrared Data Association (IrDA) technology, an Ultra WideBand (UWB) technology, a Bluetooth® (BT) technology and other technologies.

In an example, the terminal 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements, for executing the method in any one of the above embodiments.

In some examples, a non-transitory computer-readable storage medium including instructions, such as the memory 804 including instructions, is also provided. The above instructions may be executed by the processor 820 of the terminal 800 to perform any one of the above methods. For example, the non-transitory computer-readable storage medium may be a ROM, a RAM, a CD-ROM, a magnetic tape, a floppy disc, an optical data storage device, and the like.

The terminal may be used to implement an aforementioned method, for example, a method shown in any embodiment of the present disclosure.

Figure 13:
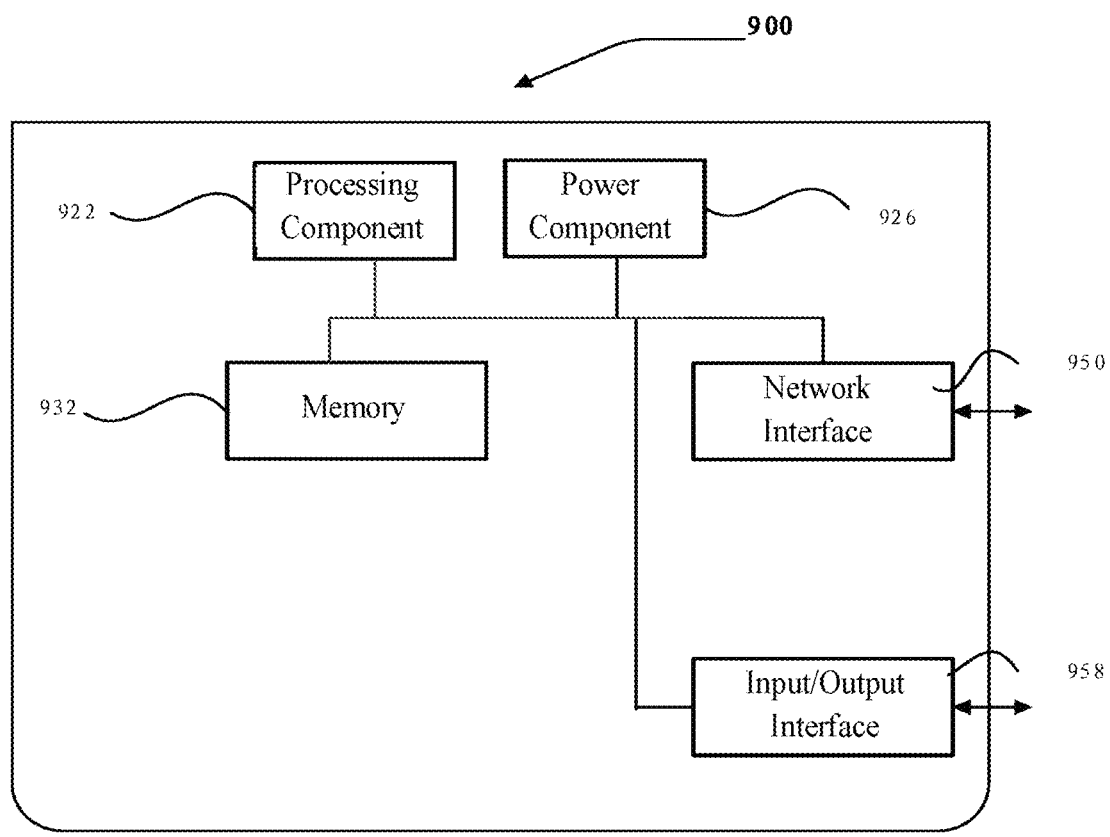
FIG. 13 is a schematic structural diagram illustrating a base station according to an embodiment of the present disclosure.

As shown in FIG. 13, a structure of a base station is provided by an embodiment of the present disclosure. For example, a base station 900 may be provided as a network-side device. Referring to FIG. 13, the base station 900 includes: a processing component 922, which further includes one or more processors, and a memory resource represented by a memory 932, the memory resource being used for storing instructions, for example, an application (APP), that can be executed by the processing component 922. The APP stored in the memory 932 may include one or more modules, each corresponding to a set of instructions. In addition, the processing component 922 is configured to execute instructions to perform any of the methods described above, such as the method shown in any of the embodiments of the present disclosure.

The base station 900 may further include a power component 926 configured to manage power supply of the base station 900, a wired or wireless network interface 950 configured to connect the base station 900 to a network, and an input/output (I/O) interface 958. The base station 900 may operate based on an operating system, such as Windows Server™, Mac OS X™, Unix™, Linux™, FreeBSD™ or the like, stored in the memory 932.

The wireless network interface 950 includes, but is not limited to, the antenna of the aforementioned communication device. After considering the specification and practicing the present disclosure, a person skilled in the art would easily conceive of other implementations of this application. This application is intended to cover any variation, use, or adaptive change of this application. These variations, uses, or adaptive changes follow the general principles of this application and include common general knowledge or common technical means in the art that are not disclosed in this application. The specification and the embodiments are considered as merely exemplary, and the real scope and spirit of this application are pointed out in the following claims.

It should be understood that this application is not limited to the precise structures described above and shown in the accompanying drawings, and various modifications and changes can be made without departing from the scope of this application. The scope of this application is limited only by the appended claims.

The invention claimed is:

1. A data transmission method, applied to a device supporting multi-link communication and comprising:
   determining channel status of at least two links in a plurality of links of the device; and
   determining, based on the channel status of the at least two links, whether to transmit first data on a first link of the at least two links; wherein the channel status is an idle status of channel or a busy status of channel; wherein the idle status of channel is a status in which no data is transmitted and the busy status of channel is a status in which data is transmitted;
   wherein the method further comprises:
   in response to determining that at least one second link is busy,
      not transmitting, in response to determining that a data frame of second data transmitted on the at least one second link comprises an Intra-Physical layer Protocol Data Unit (Intra-PPDU) of a Basic Service Set (BSS), the first data on the first link; or
      transmitting, in response to determining that the data frame of the second data transmitted on the at least one second link comprises an Inter-Physical layer Protocol Data Unit (Inter-PPDU) of the BSS, the first data on the first link;
   wherein only the Intra-PPDU is transmitted simultaneously on a same link, and the Intra-PPDU and the Inter-PPDU are not transmitted simultaneously on a same link;
   wherein when a data packet is transmitted on any link, when a type of a data frame of the data packet is the Intra-PPDU, a BSS color carried by a signal field (SIG) in a physical header of the data frame of the data packet is a first value; or
      when the type of the data frame of the data packet is the Inter-PPDU, the BSS color carried by the signal field in the physical header of the data frame of the data packet is a second value.

2. The method of claim 1, wherein determining whether to transmit the first data on the first link of the at least two links based on the channel status of the at least two links comprising:
   transmitting the first data on the first link in response to determining that the at least one second link of the at least two links is idle.

3. The method of claim 1, further comprising:
   transmitting the first data on the first link of the plurality of links in response to determining that the first link is idle.

4. The method of claim 1, wherein the type of the second data currently transmitted on the second link is determined by followings:
   determining, in response to determining that a BSS color parsed from an SIG of the data frame of the second data transmitted on the second link is identical to a BSS color of an Access Point (AP) associated with the device, the data frame of the second data transmitted on the second link comprises the Intra-PPDU; or
   determining, in response to determining that the BSS color parsed from the SIG of the data frame of the second data transmitted on the second link is different from the BSS color of the AP associated with the device, the data frame of the second data transmitted on the second link comprises the Inter-PPDU.

5. The method of claim 1, further comprising:
   determining, based on an SIG of a data frame transmitted on a second link, an indicated duration of the second link being occupied.

6. The method of claim 5, further comprising:
   determining, in response to an expiration of the indicated duration of the second link being occupied, the channel status of the at least two links in the plurality of links of the device again.

7. A computer storage medium storing non-transitory computer-executable instructions, wherein, when the computer-executable instructions being executed by a processor, the processor is configured to perform the method of claim 1.

8. A communication device, comprising:
   an antenna;
   a memory;
   a processor, respectively connected to the antenna and the memory and configured to:
   by executing non-transitory computer-executable instructions stored in the memory, control transmitting and receiving of the antenna and perform the following operations:
   determining channel status of at least two links in a plurality of links of the device; and
   determining, based on the channel status of the at least two links, whether to transmit first data on a first link of the at least two links; wherein the channel status is an idle status of channel or a busy status of channel; wherein the idle status of channel is a status in which no data is transmitted and the busy status of channel is a status in which data is transmitted;
   wherein the processor is further configured to perform following operations:
   in response to determining that at least one second link is busy,
      not transmitting, in response to determining that a data frame of second data transmitted on the at least one second link comprises an Intra-Physical layer Protocol Data Unit (Intra-PPDU) of a Basic Service Set (BSS), the first data on the first link; or
      transmitting, in response to determining that the data frame of the second data transmitted on the at least one second link comprises an Inter-Physical layer Protocol Data Unit (Inter-PPDU) of the BSS, the first data on the first link;

wherein only the Intra-PPDU is transmitted simultaneously on a same link, and the Intra-PPDU and the Inter-PPDU are not transmitted simultaneously on a same link;

wherein when a data packet is transmitted on any link,
when a type of a data frame of the data packet is the Intra-PPDU, a BSS color carried by a signal field (SIG) in a physical header of the data frame of the data packet is a first value; or
when the type of the data frame of the data packet is the Inter-PPDU, the BSS color carried by the signal field in the physical header of the data frame of the data packet is a second value.

9. The communication device of claim 8, wherein the processor is specifically configured to perform a following operation:
transmitting the first data on the first link in response to determining that the at least one second link of the at least two links is idle.

10. The communication device of claim 8, wherein the processor is further configured to perform a following operation:
transmitting the first data on the first link of the plurality of links in response to determining that the first link is idle.

11. The communication device of claim 8, wherein the type of the second data currently transmitted on the second link is determined by followings:
determining, in response to determining that a BSS color parsed from an SIG of the data frame of the second data transmitted on the second link is identical to a BSS color of an Access Point (AP) associated with the device, the data frame of the second data transmitted on the second link comprises the Intra-PPDU; or
determining, in response to determining that the BSS color parsed from the SIG of the data frame of the second data transmitted on the second link is different from the BSS color of the AP associated with the device, the data frame of the second data transmitted on the second link comprises the Inter-PPDU.

12. The communication device of claim 8, wherein the processor is further configured to perform a following operation:
determining, based on an SIG of a data frame transmitted on a second link, an indicated duration of the second link being occupied.

13. The communication device of claim 12, wherein the processor is further configured to perform a following operation:
determining, in response to an expiration of the indicated duration of the second link being occupied, the channel status of the at least two links in the plurality of links of the device again.

* * * * *